United States Patent [19]

Bergins et al.

[11] Patent Number: 4,691,314

[45] Date of Patent: Sep. 1, 1987

[54] METHOD AND APPARATUS FOR TRANSMITTING DATA IN ADJUSTABLE-SIZED PACKETS

[75] Inventors: Lewis A. Bergins, Millis; Anthony P. Amundson, Holliston; Jerry Falk, Medway, all of Mass.

[73] Assignee: Microcom, Inc., Norwood, Mass.

[21] Appl. No.: 792,757

[22] Filed: Oct. 30, 1985

[51] Int. Cl.⁴ .............................. H04J 3/24; H04J 3/16
[52] U.S. Cl. .......................................... 370/94; 371/32
[58] Field of Search .................. 370/94, 60, 89, 94 U, 370/95, 79, 83; 371/32, 33

[56] References Cited

U.S. PATENT DOCUMENTS 4,410,889 10/1983 Bryant et al. ............... 370/94 U
4,445,214 4/1984 Reynolds et al. ............ 370/94 U Primary Examiner—Douglas W. Olms
Assistant Examiner—Wellington Chin
Attorney, Agent, or Firm—Pahl, Lorusso & Loud

[57] ABSTRACT

A data telecommunications system and method is provided for sending a data stream of characters in distinct data packets between two units of data terminal equipment (which can be either terminals and/or computers) connected over communication lines. A modem is connected between each unit of data terminal equipment and the communication lines, and one initiating modem includes a means for changing the packet size of the data which is transmitted. The receiving modem checks the packets for errors, and if errors are found, the packet is retransmitted. The initiating modem counts the number of transmissions of data packets as well as the number of retransmissions of data packets. A ratio of retransmissions to transmissions is used to determine the optimum packet size. The packet size is continually subject to change as the ratio changes during transmission.

20 Claims, 4 Drawing Figures

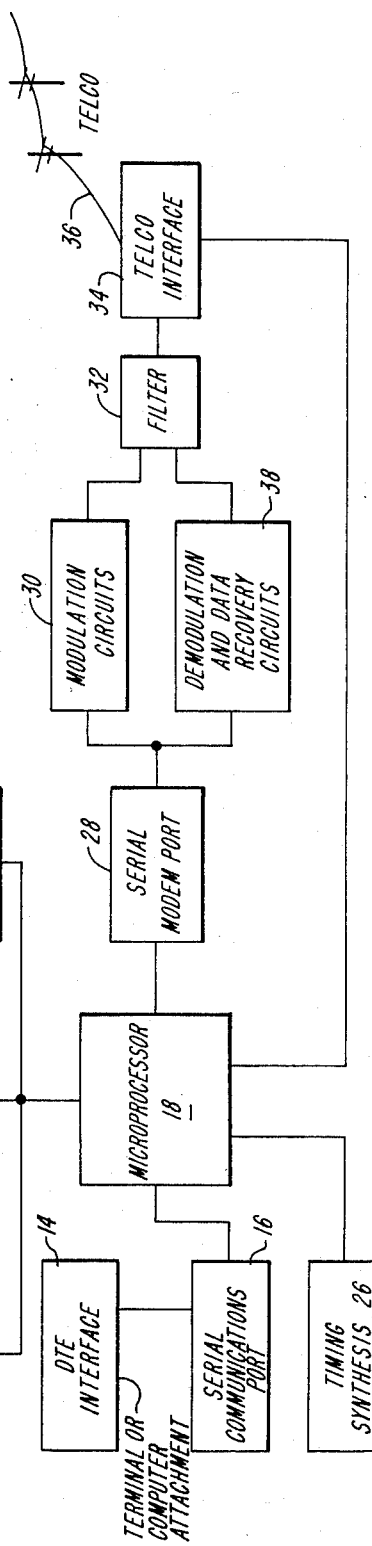
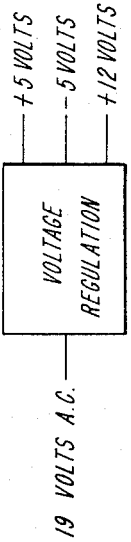
FIG. 1
FIG. 2

METHOD AND APPARATUS FOR TRANSMITTING DATA IN ADJUSTABLE-SIZED PACKETS

BACKGROUND OF THE INVENTION

This invention relates generally to a data telecommunications system, and more particularly to a system which transmits data in packets, the size of which may be changed based on transmitting conditions.

Whereas microcomputers were once only used as dedicated and completely isolated devices, they are now used for a wide range of applications, many of which require microcomputers to communicate with each other. Problems develop with such communication because of the existence of a wide variety of microcomputers which are incapable of directly communicating with each other. As a result, many data communication systems for microcomputers force the microcomputer to work principally as a dumb terminal for a remote mini- or mainframe computer. Therefore, to facilitate more sophticated communication, communication protocols which enable data communications between a wide range of computers, from low end microprocessors to large mainframes, have been developed. The proliferation of protocols, however, not to mention operating systems and microprocessors, has for the most part precluded the adoption of a standard file transfer method.

A communication protocol is basically a set of rules that defines how the computers interact. For two computers to transfer a file successfully, they must observe the same protocol. Typically, a protocol specifies when to send a message, how to format the information in the message, and at the other end, how to acknowledge the receipt of the message.

Simple physical connect protocols are concerned only with hardware configurations. Establishing the basic physical connection between two computers requires that a particular series of steps be followed. The originating modem initiates its sending sequence, and the telephone number representing the electronic address of the receiving modem is formatted as a series of pulses or tones and sent into the telephone network. The receiving modem senses the incoming call as a relatively high voltage (sufficient to cause a phone to ring) and interprets this as a request to establish a connection. If the connection is established, an acknowledgement message sent to the transmitting modem thereby establishes the connection. Such a physical link is capable of being established because both modems use the same physical connect protocol. These basic connect protocols are fairly standard, particularly for the low speed, asynchronous modems commonly used with microcomputers, such as Bell 103 and 212A modems. However, as communications become more complex and involve dissimilar machines and file formats, the protocols must, in turn, become increasingly sophisticated.

Connecting two computers is only a small part of the communications work necessary for accurate data transfer. Telephone lines are often noisy, and errors can crop up in the transmitted data. These errors must be detected and corrected. The resources available to store incoming data must also be passed and matched so that the recipient is not flooded with data. Also, information regarding the computer file system must be swapped and file movement and manipulation must be defined. These concerns, therefore, go beyond the physical-level protocols into the realm of complex communications protocols.

One protocol which enables complex communications between microcomputers is the Microcom Networking Protocol (MNP) which has been developed by Microcom Corporation of Norwood, Massachusetts, the assignee of the present application. MNP provides a sophisticated communications system which includes provisions for both reliable terminal-type communications and reliable file transfer in a manner which can reasonably be implemented on a wide range of computers. MNP accounts not only for hardware and operating system differences, but also provides sophisticated error checking. As a result, file exchanges are thus possible between almost any computers using an MNP based communication system.

The MNP protocol, which has been developed principally for use with microcomputers, includes three layers, and the use of only three layers enables MNP to provide the necessary services with the desired space and performance characteristics for a microcomputer environment. The three layers or modules are combined to perform a series of complex functions in a manner in which changes in one module may not drastically affect another module, as long as certain parts of the module's interface remain the same.

In MNP, each layer is relatively isolated and provides a specific service. If a change is forced in one layer (for example, if MNP is modified for use on a new computer), the change is confined to that layer while the layer's standard interface to the other layers remains unchanged. In addition to ensuring machine portability, MNP's structure allows services provided by one layer to support those in the layer above. The accumulation of services is then passed upward, from layer to layer to the applications program. MNP defines three unique protocol layers in addition to the physical connection: the link, the session, and the file protocol layers. The protocol layers are triggered sequentially from the bottom (physical) to the top (file transfer).

The link layer is responsible for providing reliable, controlled data transmission over a medium that is inherently noisy and likely to cause errors. Once a physical connection is established between two machines, the link protocol acts as a negotiator causing both computers to agree on the nature of the link. For example, the link protocol establishes whether the connection will be half- or full-duplex, how many data messages can be sent before confirmation is required, the size of a single data packet, etc. After establishing values for the above requirements, the link protocol initiates data transfer, paces the flow of data and, if necessary, retransmits data messages that contain errors due to telephone line noise. The link protocol allows blocks or packets of data (as opposed to individual bytes) to be sent synchronously or asynchronously to the receiving computer. Data transfer is faster when packets are transmitted synchronously because start and stop characters are not needed, and as a result, the ratio of data to control characters regulating the transfer is higher. Control is possible because of a mainframe-like (framing) technique in which a block of data is carried from both ends with specific codes.

The session layer negotiates with the receiving computer with respect to the pertinent system and file information including computer type, how files are formatted, the type of information transmitted (e.g. ASCII, binary) and the user's identity. This layer also provides the automatic negotiation of which level of service can be used between the two communicating devices.

The file transfer layer defines and formats the messages involved in file transfers and manipulations. There are three transfer services available: one allowing the sending of a file, the second allowing the receipt of a file, and the third allowing the appending of a file to an existing file at the other end of the communications link. The file transfer protocol also enables the manipulation of distant computer files. For example, such files can be deleted, renamed or file directories may be displayed. A typical file transfer starts when one computer sends a "file start" message to the other computer. The file start message includes the requested file's name, size and format along with any password needed for the file's return trip to the requesting computer. Both computers exchange "hellos" along with a confirmation that a file will be soon filed by one side and accepted by the other.

In order for any communications protocol to facilitate communications among a wide variety of computers, the protocol must be able to operate in a number of modes. These modes include a matched-protocol mode for use by two communicating devices supporting the same protocol. Such a matched-protocol mode may provide optimized data transmission including any of a number of known optimizing features such as detecting and correcting errors, optimizing transmission speed, etc. A second mode which allows straight forward data transmission (without any optimizing features) between two communicating systems must also be provided. The operating mode is generally negotiated in a lower link layer, and in MNP the mode is selected in the link layer.

A modem operating under the MNP protocol discussed above has four basic modes: reliable mode, normal mode, auto-reliable mode, and direct mode. The reliable mode is the basic matched-protocol mode of MNP which provides error detection and automatic retransmission of data when an error occurs in order to ensure that communications between two communicating systems are error-free. In order to utilize this reliable mode, however, both of the communicating modems must be able to support this mode. A second mode, MNP's normal mode, allows a modem with MNP to communicate with a modem not supporting this protocol. MNP's auto-reliable mode is an extension of the reliable mode which will automatically connect two modems in a reliable mode if such a connection is possible. In other words, if both of the communicating modems can support MNP, a reliable, error-correcting connection is established. The auto-reliable mode differs from the reliable mode insofar as the modem in the auto-reliable mode initially looks for incoming MNP protocol characters from the remote modem. If, after a predetermined amount of time has expired, these MNP characters are not detected a normal link is established. If these characters are detected, a reliable link is established. A fourth mode, the direct mode, is used for special purpose formats or character sets, and the modem buffers and flow control command settings are ignored.

Data sent from one modem to another is usually transmitted as part of a data packet, the size of which is determined by the link layer. Data packets generally include, in addition to the data, header and trailer data which among other purposes identifies the beginning (header) and end (trailer) of each data packet. The header and trailer information may also be used for indicating the type of packet (ex. acknowledgement, control, data packet), the CRC code, and any other identifying information. While the data packets are very useful for maintaining error-free transmission, the header and trailer information increases the amount of data transmitted and as a result data throughput is reduced.

In order to increase the data transmission rate or throughput, many techniques involving the manipulation of the transmitted data are utilized. One such technique is to increase the size of the packets of data which are sent by a modem. Such increased packet size produces an increase in throughput because there is less header and trailer information sent since fewer packets are actually transmitted.

While ideally such increased packet size should speed transmission, the nature of the transmitting environment actually leads to the opposite result. Since telephone lines are often noisy and other hardware problems produce errors in the transmitted data, it is often necessary when using an error-correcting protocol to retransmit many packets of data which contain data errors. The retransmission of larger sized packets thereby results in unnecessary transmission of data because for each altered transmitted character many more correctly transmitted characters must be retransmitted thereby decreasing throughput. Therefore, if many data packets are retransmitted, smaller packet sizes are actually beneficial since less data has to be retransmitted.

Known modems which transmit data in packets are designed so that the packet size is chosen which compromises the advantages of large packet sizes with the advantages of small packet sizes. The nature of the transmitted data, as well as the transmitting conditions, however, frequently change so that an optimum packet size will, in reality, not be optimum for all situations.

It is therefore a principal object of the present invention is to provide a data transmission system and method in which the packet size of the data being sent by a modem over telephone lines is optimized.

Another object of the present invention is to provide a data communication system and method in which the data packet size can be optimized in real time as a function of the data stream being transmitted as well as the transmitting environment.

Still another object of the present invention is to provide a data communications system and method in which data may be transmitted in any of a number of packet sizes.

SUMMARY OF THE INVENTION

In accordance with the present invention, a data telecommunications system and method is provided for sending a data stream of characters in distinct data packets between two units of data terminal equipment (which can be either terminals and/or computers) connected over communication lines. A modem is connected between each unit of data terminal equipment and the communication lines, and one initiating modem includes a means for changing the packet size of the data which is transmitted. The receiving modem checks the packets for errors, and if errors are found, the packet is retransmitted by the initiating modem.

The initiating modem keeps count of the number of data packets transmitted as well as the number of data packets retransmitted. A ratio of retransmissions to transmissions is utilized to determine a line quality which in turn is used to establish the optimum packet size. The line quality is determined in real time so that a change in the transmitting environment will result in a change in the packet size.

These and other objects and features of the present invention will be better understood from the following detailed description which should be read light of the accompanying drawings in which corresponding reference numerals refer to corresponding parts throughout the several views.

BRIEF DESCRIPTIONS OF THE DRAWINGS

FIG. 1 is a generalized schematic view of a data telecommunications system;

FIG. 2 is a schematic view of a modem of the present invention;

Figure 3A:
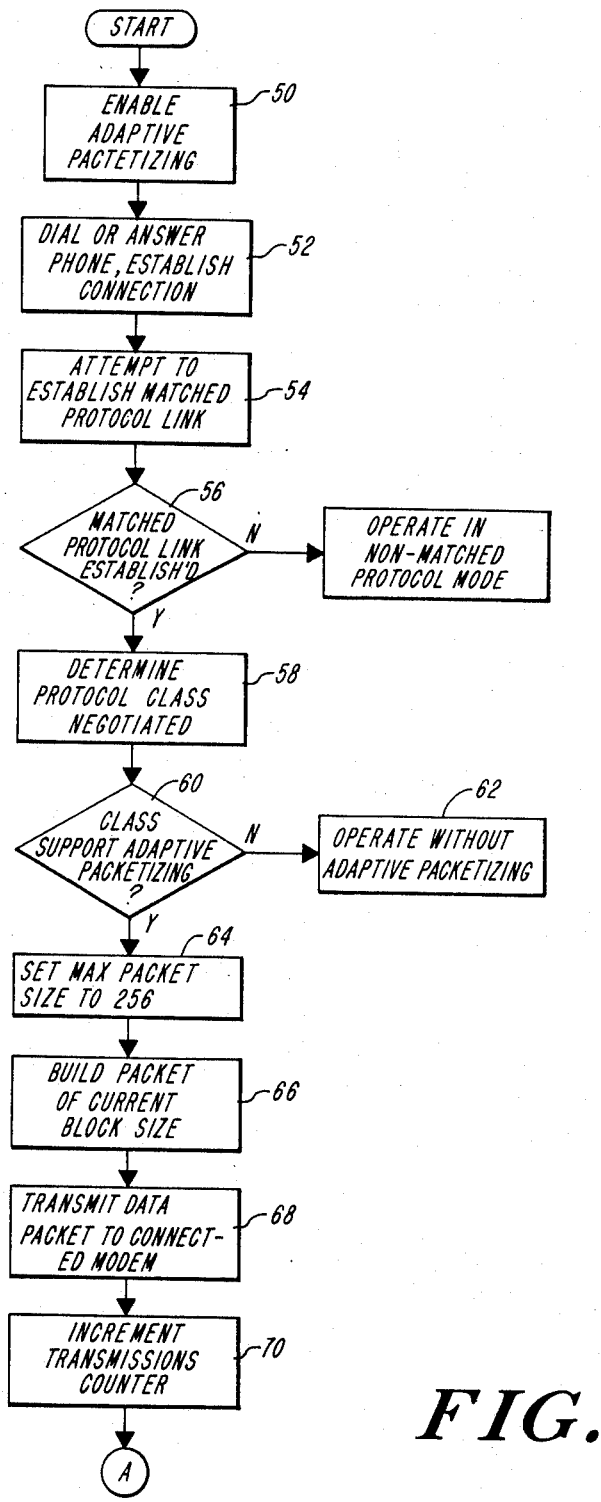
Figure 3B:
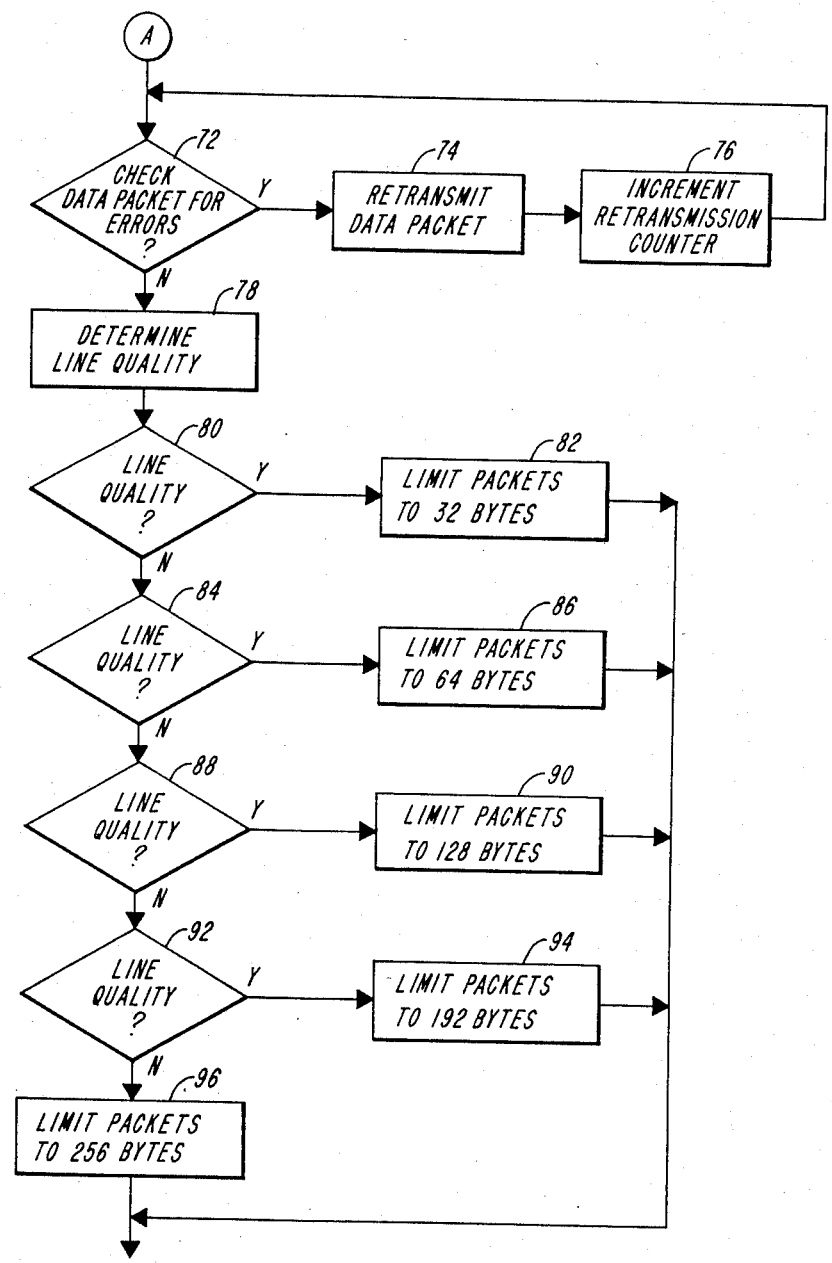

FIGS. 3(a) and 3(b) are flow diagrams of the steps utilized by the modem of the present invention in optimizing the size of the transmitted data packets.

Appendix A is a listing of computer instructions which may be utilized in a system of the present invention.

DETAILED DESCRIPTION OF THE PREFERRED EMBODIMENT

A basic data telecommunications system, shown in FIG. 1 includes an initiating unit of data terminal equipment 10, such as, but not limited to, a dumb terminal or a microcomputer, and a receiving unit of data terminal equipment (DTE) 12. An initiating modulator/-demodulator (modem) 11 is connected between unit 10 and communication lines (such as, but not limited to telephone lines), and a receiving modem 13 is connected between unit 12 and communication lines.

A modem of the communication system of the present invention is shown in FIG. 2. While the system of the present invention will include at least one modem of the type described below, it is preferable that both modems be of this type. For purposes of the following discussion, the modem of the system will be described with reference to modem 13. The modem 13 includes a DTE-interface 14 which receives data coming from DTE unit 12. Data characters supplied to the DTE-interface 14 pass through a serial communications port 16 of the microprocessor 18 to which characters are fed in a serial fashion. The microprocessor 18 has connected to it status indicators 20, a program and data memory 22 and parameter setting switches 24. Timing synthesizing circuitry 26 is also connected to the microprocessor 18. Data processed by the microprocessor 18 is sent through a serial modem port 28 to modulation circuits 30 which will pass data on through a filter 32 to a telephone interface 34 and then onto communication lines over which the data will be transmitted to another microcomputer. The modem 13 also includes demodulation and data recovery circuits 38 which are used for receiving data from another remotely situated modem, such as modem 11. When the modem 13 acts as a receiving modem, data passes through the same elements described above in a reverse order following the passage of data through the demodulation and data recovery circuits 38.

A modem 11 of the data telecommunications system of the present invention optimizes the size of the data packets taking into account the number of retransmissions of data packets. The optimizing or adapting of the packet size is preferably performed in real time so that changes in the transmitting environment will result in changes in the packet size, thereby maintaining an optimum throughput.

Referring to FIG. 3, in order to enable a modem to optimize or adapt the packet size of transmitted data packets, the adaptive packetizing feature of the modem 11 is actuated in step 50. For a modem 11 to begin operation in an adaptive packetizing mode, a physical communications link with another modem must be established, and such a link is established after a receiving modem answers a call and acknowledges receipt in step 52. After a physical link is established, if one of the modems is capable of operating under a special matched-protocol, an attempt is made in step 54 to establish a link under that protocol. A matched-protocol is necessary because the receiving modem must be capable of accepting data in packets with compatible header and trailer information.

In step 56, the modem 11 determines whether a matched-protocol link is established, and if such a link is established, the class of operation in the matched-protocol is then negotiated in step 58. If the negotiated class is a class which does not provide for adaptive packetizing, then communications begin without adaptive packetizing in step 62. If, on the other hand, the class negotiated will support adaptive packetizing, step 60 will initiate adaptive packetizing with the maximum block size set to 256 bytes in step 64. With the packet size set by step 64, the modem 11 will start building packets of the set size from the stream of data characters which is transmitted from the initiating unit of data terminal equipment. After each packet is built, it is transmitted by the modem 11 to the modem 13 over communication lines in step 68. The modem 11 will then, in step 70, increment a counter storing the number of data packets transmitted. The transmitted data packet is checked by receiving modem 13 for errors, preferably using CRC 16 in step 72. If an error occurred in the transmisison of the data, the receiving modem requests that the data packet be retransmitted, and in step 74 modem 11 retransmits the data to modem 13. In step 76, a counter storing the number of retransmissions is incremented, and then the data packet is once again checked for errors by receiving modem 13 in step 72.

After the data packet has been successfully transmitted, the transmission line quality is determined in step 78. The transmission line quality indicates the reliability of the transmitting environment by representing the percentage of data packets which must be retransmitted. In order to simplify the adapting of packet sizes, the line qualities represent a range of the percentage of retransmissions, and in the embodiment of FIG. 3, there are five possible ranges or line qualities each having an associated packet size. Basically, when the percentage of retransmissions falls into a different range (or when the line quality changes), the size of the packet is changed.

In step 80, the modem transmitting the data will check if the line quality is the lowest possible acceptable line quality (or in the FIG., line quality "A"). If such is the case, the packet size will be limited to the lowest acceptable packet size (32 bytes in the example) in step 82. Other intermediate line qualities are tested from a lower quality to a higher quality (line qualities "B" thorugh "D") in steps 84, 88 and 92, respectively. If the actual line quality falls within one of these tested line qualities, the packet size will be limited to an appropriate size for that line quality in steps 74, 78 and 82, respectively. In the example of FIG. 3, the packet sizes are 64, 128 and 192 bytes for line qualities B, C and D respectively. If in fact the line quality falls within the highest range, then the packet size will be set at the maximum preset packet size (256 bytes in the example) in step 84.

As mentioned above, line quality is a function of the percentage of transmitted data packets which must be retransmitted. Specifically, line quality is determined as follows:

$$LQ = MAX\ [MIN\ [LQ' + (T*Y),\ 255] - (R*X),\ 0]$$

where
LQ = New Line Quality
LQ' = Previous Line Quality
R = Number of Retransmissions
T = Number of Transmissions
X = Retransmission Constant
Y = Transmission Constant At the beginning of each transmission the initial value for the line quality is set, and the retransmission and transmission constants X, Y are given preset values. In the example of FIG. 3, suitable constants could be X = 20 and Y = 1, and LQ could initially be set equal to 192.

The system of the present invention has been described above as transmitting individual data packets. The system could also transmit groups of data packets, and if an error is detected in the group either part of the group or the entire group is retransmitted. In such a situation, the system could count either the number of packets or the number of groups of packets transmitted and retransmitted.

While the foregoing invention has been described with reference to its preferred embodiments, various modifications and alterations will occur to those skilled in the art. For example, while FIG. 3 shows the line quality divided into five separate ranges and associated packet sizes, any reasonable number of ranges and packet sizes may be employed. These and all such modifications and alterations are intended to fall within the scope of the appended claims.

APPENDIX A

```
01A7 FE08      450        CP      8               ;param 8?
01A9 2008      451        JR      NZ,PN           ;no-go on
01AB 7E        452        LD      A,[HL]          ;get parameter
01AC E603      453        AND     C_PARM8         ;negotiate common parameters
01AE 320000    454        LD      [LCBPARM8],A    ;and save
01B1 1800      455        JR      P80T            ;process next parameter 00BF 3A0000    311        LD      A,[LCBPARM8]    ;get received parameter 8
00C2 E603      312        AND     C_PARM8         ;negotiate minimum service
00C4 320000    313        LD      [LCBPARM8],A    ;save
00C7 2808      314        JR      Z,LR4           ;any data phase optimization???
               315
00C9 3A0000    316        LD      A,[LRLI]        ;yes...send negotiated values
00CC C603      317        ADD     A,3
00CE 320000    318        LD      [LRLI],A
               319 ;
00D1 210000    320 LR4    LD      HL,LRBUF        ;point HL to buffer
00D4 1861      321        JR      LSND            ;and go send it 349 ; LPDU type = Link Data
       (0104)  350 LSNDLT EQU     $
0104 E5        351        PUSH    HL
0105 CD0000    352        CALL    RESDISC         ;reset inactivity timer
0108 E1        353        POP     HL
               354 ;
               355 ; increment adaptive packet size variable whenever an LT is sent
               356 ;
0109 3A0000    357        LD      A,[LCBADAPT]    ;get variable
010C FEFF      358        CP      0FFH            ;256??
010E 2804      359        JR      Z,LSNDLT5       ;if so leave alone
0110 3C        360        INC     A               ;else increment
0111 320000    361        LD      [LCBADAPT],A    ;and restore
       (0114)  362 LSNDLT5 EQU    $
               499 ;
01DA           500        TSTFLG  L_USER,LCBLSW2  ;stream mode?
01DF 202A      501        JR      NZ,LD10         ;if not...go on
               502 ;
01E1           503        TSTFLG  L_MAX256,LCBPARM8 ;is max user data 256?
01E4 280F      504        JR      Z,LD05          ;if not go on
               505
```

```
01EA 210100    506           LD      HL,256            ;else set max packet size to 256!
01EB 220000    507           LD      [LCBMXDT],HL
               508 ;
01EE 3A0000    509           LD      A,[BLKMBS]        ;initialize max lt pdu size
01F1 CD0747    510           CALL    CALMXPDU          ;go calculate size in bytes
01F4 220000    511           LD      [LCBMXPDU],HL     ;save for later use
               616 ;
029D 210040    617           LD      HL,64             ;assume Max lt pdu = 64
02A0 220000    618           LD      [LCBMXPDU],HL     ;save for later use
               619 ;
               620 ;     - initialize adaptive packet variable to 196
               621 ;
02A3 3EC4      622           LD      A,196
               1045 ;
               1046 ; calculate the new maximum packet size
               1047 ;
0533           1048          TSTFLG  L_MAX256,LCBPARM8 ;using adaptive block sizes?
0538 283B      1049          JR      Z,TRINIT10        ;if not go on
053A 3A0000    1050          LD      A,[LCBADAPT]      ;get current packet threshold
053D 210020    1051          LD      HL,32             ;assume packet size of 32!!!
0540 FE20      1052          CP      32                ;are we
0542 381E      1053          JR      C,TRINIT06        ;if ;the line is this bad use 32!
               1054 ;
0544 0600      1055          LD      B,0               ;assume max packet = 64
0546 FE40      1056          CP      64                ;is threshold less than 64?
0548 380E      1057          JR      C,TRINIT01        ;if so go on
054A 0601      1058          LD      B,1               ;assume 128
054C FE80      1059          CP      128               ;less than 128?
054E 380A      1060          JR      C,TRINIT01
0550 0602      1061          LD      B,2               ;assume 128
0552 FEC4      1062          CP      196               ;less than 196?
0554 3802      1063          JR      C,TRINIT01
0556 0603      1064          LD      B,3               ;must be 256
0558 3A0000    1065 TRINIT01 LD      A,[BLKMBS]        ;now take minimum of user settable
055B B8        1066          CP      B                 ;value and calculated value
055C 3801      1067          JR      C,TRINIT05
055E 78        1068          LD      A,B
(055F)         1069 TRINIT05 EQU     $
055F CD0747    1070          CALL    CALMXPDU          ;go calculate size in bytes
(0562)         1071 TRINIT06 EQU     $
0562 E5        1072          PUSH    HL                ;save size on stack
               1333 ; for every retransmission cycle reduce adaptive packet variable
               1334 ;
06CD           1335          TSTFLG  L_MAX256,LCBPARM8 ;is max user data 256?
06D2 280B      1336          JR      Z,RT11            ;if not go on
06D4 3A0000    1337          LD      A,[LCBADAPT]      ;get packet size threshold
06D7 D618      1338          SUB     24                ;subtract 24 from count
06D9 3001      1339          JR      NC,RT101          ;if ) 0 go on
06DB AF        1340          XOR     A                 ;if negative...stay at 0
(06DC)         1341 RT101    EQU     $
06DC 320000    1342          LD      [LCBADAPT],A      ;and save
               1343 ;
               1422
(0747)         1423 CALMXPDU EQU     $
               1424 ;
               1425 ;    - Calculate maximum lt lpdu size
```

```
                1426 ;
                1427 ;   input A = max block size
                1428 ;        0 = 64, 1 = 128, 2 = 192, 3 = 256
                1429 ;   output HL = max block size in bytes
                1430 ;
0747 210000     1431     LD      HL,0
074A 3C         1432     INC     A                        ;now convert input to bytes
074B 0F         1433     RRCA
074C 0F         1434     RRCA
074D FE01       1435     CP      1
074F 2002       1436     JR      NZ,LTPDU1
0751 67         1437     LD      H,A
0752 C9         1438     RET                              ;we done
```

What is claimed is:

1. A method of transmitting data in packets in a data telecommunications system, said system including an initiating unit of data terminal equipment and a receiving unit of data terminal equipment, a first modem connected between the initiating unit and communication lines and a second modem connected between said receiving unit and said communication lines, said method comprising the steps of:

transmitting a stream of data characters from said initiating unit to said first modem for transmission over communication lines to said second modem;

dividing said data stream received by said first modem into packets of data with each packet including additional, identifying data;

transmitting one data packet or one group of data packets at a time from said first modem to said second modem over communication lines;

checking data in said transmitted data packets for errors, and when an error is detected retransmitting said data packet;

incrementing a counter representing a number of retransmissions of data packets or groups of data packets for each data packet or group of data packets that is retransmitted;

incrementing a counter representing a number of transmissions of data packets or groups of data packets for each data packet or group of data packets that is transmitted;

determining an optimum packet size based on a ratio of retransmissions to transmissions.

2. The method of transmitting data packets of claim 1 wherein initially sent data packets are of a maximum size.

3. The method of transmitting data in packets of claim 1 wherein said first modem transmits data in packets of one of a plurality of preselected data packet sizes.

4. The method of transmitting data in packets of claim 5 wherein said step of determining optimum packet size comprises:

assigning a line quality level for each of said ratios each of said line quality levels designating a preselected range of said ratio;

organizing data in packets of a size corresponding to said assigned line quality level.

5. The method of transmitting data in packets of claim 1 further comprising the step of redetermining said optimum packet size as said ratio changes.

6. The method of transmitting data in packets of claim 1 further comprising the step of enabling said determining of optimum packet sizes prior to commencement of said transmitting of data characters.

7. A method of transmitting data in packets in a data telecommunications system, said system including an initiating unit of data terminal equipment and a receiving unit of data terminal equipment, a first modem connected between the initiating unit and the communication lines and a second modem connected between said receiving unit and said telephone lines, said method comprising the steps of:

(a) transmitting a stream of data characters from said initiating unit to said first modem for transmission over communication lines to said second modem;

(b) forming a data packet of the next N characters in said data stream received by said first modem, said data packet including additional identifying data;

(c) transmitting said data packet or a group of said data packets from said first modem to said second modem;

(d) incrementing a counter indicating the number of data packets or groups of data packets transmitted;

(e) checking said data in said transmitted data packet for errors;

(f) if an error is found in a transmitted data package, incrementing a counter indicating the number of data packets or groups of data packets retransmitted and repeating steps (c) through (e);

(g) determining an optimum packet size N based on a ratio of retransmissions to transmissions;

(h) repeating steps (b) through (g) until said data stream is transmitted.

8. The method of transmitting data packets of claim 7 wherein initially sent data packets are of a maximum size.

9. The method of transmitting data in packets of claim 7 wherein said first modem transmits data in packets of one of a plurality of preselected data packet sizes.

10. The method of transmitting data in packets of claim 9 wherein said step of determining optimum packet size comprises;

assigning a line quality level for each of said ratios, each of said line quality levels designating a preselected range of said ratio;

organizing data in packets of a size corresponding to said assigned line quality level.

11. The method of transmitting data in packets of claim 1 further comprising the step of redetermining said optimum packet size as said ratio changes.

12. The method of transmitting data in packets of claim 1 further comprising the step of enabling said determining of optimum packet sizes prior to commencement of said transmitting of data characters.

13. A data telecommunication system for transmitting data in packets over communication lines including an initiating unit of data terminal equipment and a receiving unit of data terminal equipment, a first modem connected between the intiating unit and communication lines and a second modem connected between the receiving unit and communication lines, the first and second modems including means to transmit data between said modems, the system comprising:

means for dividing data transmitted from said initiating modem to said first modem into distinct data packets each of said packets including identifying data, and said means for transmitting data between said first and second modems including means to transmit said data packets;

means for detecting errors in said data packets transmitted between said first and second modems;

means for retransmitting data packets in which errors have been detected;

means for counting the number of data packets or groups of data packets transmitted and means for counting the number of data packets or groups of data packets retransmitted means for determining an optimum size of said data packets based on a ratio of said count of transmissions to a count of retransmissions.

14. The data telecommunications system of claim 13 wherein said means for determining an optimum size further comprises:

means for assigning a line quality level for each of said ratios, each of said line quality levels designating a pre-selected range of said ratio;

means for organizing data in packets of a size corresponding to said assigned line quality level.

15. The data telecommunications systems of claim 13 further comprising:

means for enabling said means for determining an optimum packet size prior to commencement of said transmitting of data characters.

16. The data telecommunications system of claim 15 wherein said enabling means is a manually operable switch located on the exterior of said first modem.

17. A modem for use in a data telecommunications system for transmitting data in packets over communication lines, said modem connected between the unit of data terminal equipment and communication lines, said modem including means to transmit data between said modem and a second modem, the modem comprising:

means for dividing data transmitted from said modem to said second modem into distinct data packets each of said packets including identifying information, and said means for transmitting data between said modem and second modem including means to transmit said data packets;

means for detecting errors in said data packets transmitted between said modem and second modem;

means for retransmitting data packets in which errors have been detected;

means for counting the number of data packets or groups of data packets transmitted and means for counting the number of data packets or groups of data packets retransmitted;

means for determining an optimum size of said data packets based on a ratio of said count of transmissions to said count of retransmissions.

18. The modem of claim 17 wherein said means for determining an optimum size further comprises:

means for assigning a line quality level for each of said ratios, each of said line quality levels designating a pre-selected range of said ratio;

means for organizing data in packets of a size corresponding to said assigned line quality level.

19. The modem of claim 17 further comprising:

means for enabling said means for determining an optimum packet size prior to commencement of said transmitting of data characters.

20. The modem of claim 19 wherein said enabling means is a manually operable switch located on the exterior of said first modem.

* * * * *